June 27, 1967    S. BERLANT    3,327,697

COOKING DEVICE PROVIDED WITH AIR CURTAIN

Filed Sept. 24, 1965

INVENTOR.
SIGMUND BERLANT,
BY
Robert G. McMorrow.
ATTORNEY.

3,327,697
COOKING DEVICE PROVIDED WITH AIR CURTAIN
Sigmund Berlant, 2400 NW. 75th St., Miami, Fla. 33147
Filed Sept. 24, 1965, Ser. No. 489,839
5 Claims. (Cl. 126—25)

ABSTRACT OF THE DISCLOSURE

A cooking grill with spaced apart walls defining a chamber into which cooling air forced by a compressor or the like, the walls having an annular outlet to provide an air curtain about the cooking area.

---

This invention relates to cooking devices, and more specifically to cooking devices provided with air curtain apparatus to surround the cooking area thereof and thereby protect the user of the device from contact with heat and smoke from the cooking operation.

The general objective of this invention is to provide a cooking device having a cooking area, and an air curtain arranged to force a constant stream of air between the cooking area and the user of the appliance.

Another object of the invention resides in the provision of a double walled cooking appliance, there being a space between the walls defining an air chamber, insulating the outer wall from the heat of the inner wall whereby it remains relatively cool to avoid burning from contact therewith.

Yet another object concerns the provision of a cooking appliance as aforesaid having a plurality of openings of small diameter in the inner wall thereof, admitting an up draft of forced air under pressure therethrough to create a draft increasing the intensity of heat and temperature of combustion in the cooking area. A related objective is to provide a cooking appliance of the type employing charcoal as fuel wherein the charcoal creates an intense cooking heat effective to sear meats and the like placed thereon, and wherein the charcoals may be ignited without the necessity for soaking in volatile chemical substances which are dangerous and adversely effect the taste of the cooked foods.

Another object of the invention, in one form thereof, is to provide a surrounding air curtain for a cooking applaince, the air curtain being inwardly inclined to maximize access to the cooking area and to contain the smoke and heat in a reduced area.

Other and further objects and advantages of the invention will become apparent to those skilled in the art from a consideration of the following specification, when read in conjunction with the annexed drawing, in which.

Figure 1:
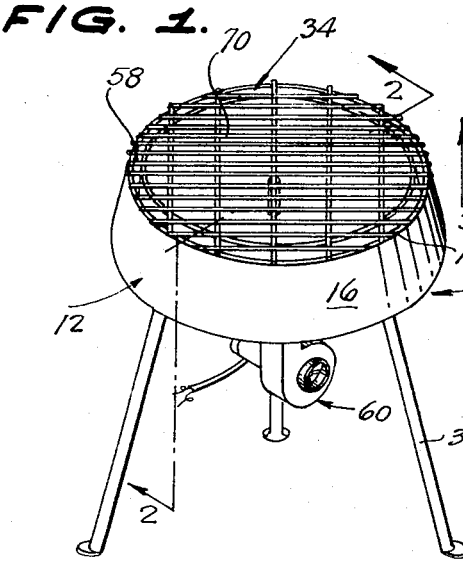
FIGURE 1 is a perspective view of a typical form of cooking appliance constructed and assembled in accordance with the teachings of this invention.

Referring to the drawing in more detail, and initially to FIGURES 1 through 4 a first form of cooking device is designated therein by reference 10. The device 10 is formed of metal or other heat resistant material and may be of any form and appearance within the scope of the invention.

The device 10 includes an outer wall assembly 12 having a flat base 14, and an inwardly inclined, upwardly extending peripheral side wall 16. The outer wall has inner and outer surfaces 18, 20, respectively, and the side wall 16 terminates in a distal end edge 22. The base 14 has a substantially centrally located opening 24 formed therein, with a downward flange 26 thereabout. The flange 26 terminates in a horizontal connection flange 28, for purposes described below.

Support means, such as a plurality of legs 30 is supplied. The legs are connected, as by conventional screw joints 32, to the outer surface 20 of the wall 14. Other types of support may be substituted for the legs 30, if desired.

Figure 2:
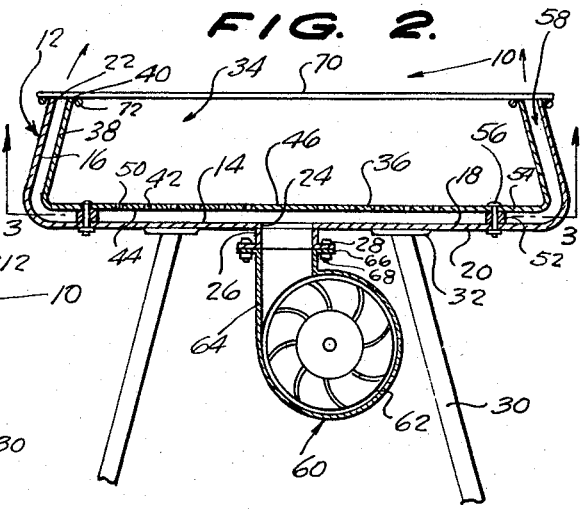
FIGURE 2 is an enlarged vertical cross sectional view, taken substantially on the line 2—2 of FIGURE 1, looking in the direction of the arows.
Figure 3:
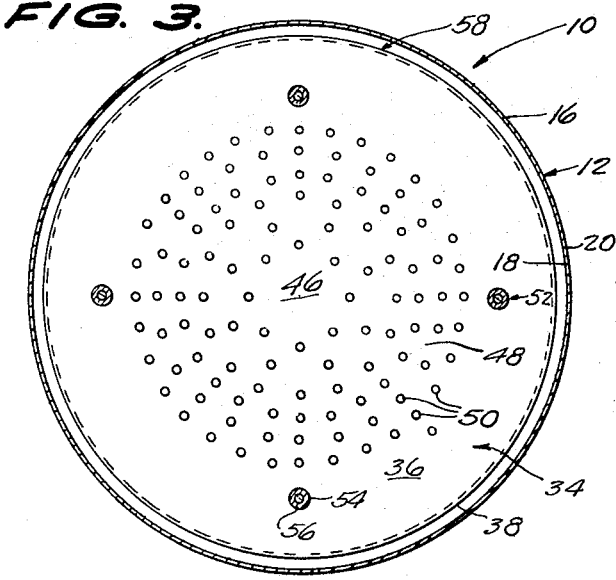
FIGURE 3 is a section on the line 3—3 of FIGURE 2, looking in the direction of the arrows.

The invention further comprises an inner brazier assembly 34 having a base 36 and peripheral side wall 38. The side wall 38 is inclined similarly to the side wall 16 of the outer wall, and has an end edge 40 which is substantially co-planar with the edge 22 thereof as shown in FIGURE 2. The brazier has inner and outer surfaces 42, 44, and the base 36 has an imperforate central section 46 arranged over the opening 24 of the outer wall base 14. Surrounding the imperforate section 46 is a section 48 having a plurality of apertures 50 formed therein. The apertures 50 are of reduced diameter in comparison to the diameter of the opening 24.

The outer wall 12 and the brazier 34 are connected to one another by a plurality of spacer means 52. Means 52 includes a plurality of tubular elements 54 of fire resistant material through which extend bolts 56 secured to the bases of the outer wall and brazier. Thus, the outer wall and braizer are secured to one another in such manner as to define an air passage chamber 58 therebetween.

A centrifugal blower 60 or other air movement device is provided and has a housing 62 with an extended air discharge nozzle 64. The nozzle 64 terminates in a flange 66 connected by bolts 68 to the connection flange 28 of the outer wall. The blower is powered by any suitable means, the present embodiment being shown as connected to an electrical power supply.

A grill member 70 of heavy wire or the like is provided, and has depending peripheral wires 72 adapted to fit about the side wall edges 22 and 40 to maintain stability.

In use, air discharged from the blower 60 is forced through the nozzle 64 into the air chamber 58, initially impinging the imperforate section 46 of the brazier base 36 and being substantially uniformly spread by such impingement. A small quantity of air is forced upwardly through the apertures 50, resulting in improved updraft, but the major volume of air from the blower 60 flows between the side walls 16 and 38 and outwardly in an upwardly and inwardly inclined stream or air curtain, effectively screening the user of the appliance 10 from heat and smoke from the cooking operation.

Figure 5:
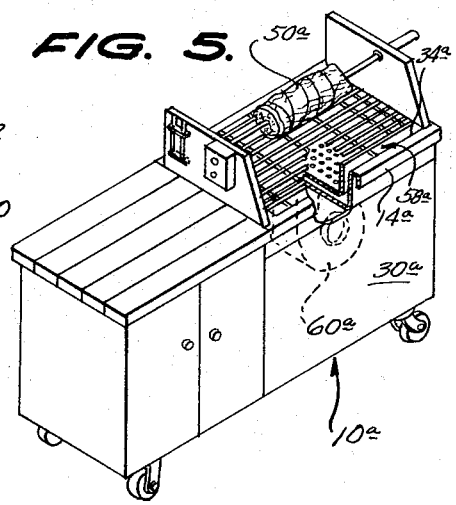
FIGURE 5 is a perspective view of a modified form of the invention.
Figure 4:
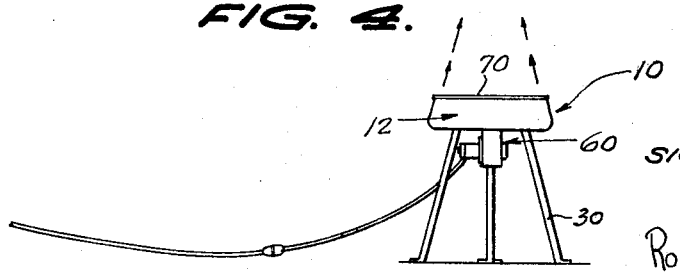
FIGURE 4 is an elevational view on reduced scale.

FIGURE 5 is illustrative of one of several possible modifications wherein the concept of a surrounding air curtain in a cooking device is embodied. In this modification, the appliance 10a has a console-like support 30a with a double walled cooking compartment 14a, 34a. Blower 60a is arranged to force air through openings 50a in the brazier 34a and outwardly of a chamber 58a—in this instance in a substantially vertical flow path.

Having described and illustrated two embodiments of this invention in some detail, it will be understood that these descriptions and illustrations are offered merely by way of example, and that the invention is to be limited in scope only by the appended claims.

What is claimed is:
1. A cooking device of the type adapted for burning charcoal or the like, the cooking device comprising:

an outer wall having a base portion with a substantially centrally located opening formed therein;

the outer wall including an inwardly inclined, peripheral side wall having a rim;

an inner brazier of reduced size relative to the outer wall including a base portion with an imperforate section overlying the opening of the outer wall, and a surrounding section with a plurality of reduced diameter apertures formed therein;

the inner brazier having an inwardly inclined, peripheral side wall with a rim;

a grill resting on the side wall of the brazier;

spacer means extending between the outer wall and the brazier to space the same from one another thereby to define an air passage chamber therebetween;

the brazier being spaced from the outer wall throughout substantially the full extent of each and the peripheral side wall, and the air from said chamber being discharged at the rims of the side walls; and a centrifugal blower with a nozzle outlet secured to the base of the outer wall whereby air is introduced between the outer wall and the brazier and expelled through the reduced diameter openings and between the side walls to form an upwardly and inwardly inclined air curtain.

2. The invention of claim 1: and support means on the outer wall.

3. A cooking device comprising:

an outer wall having a base portion with an opening formed therein;

the outer wall including a side wall;

an inner brazier including a base portion with an imperforate section overlying the opening of the outer wall and having a plurality of reduced diameter apertures formed therein;

the inner brazier having a peripheral side wall;

a grill resting on the side wall of the brazier;

spacer means extending between the outer wall and the brazier to space the same from one another and to define an air passage chamber therebetween;

the brazier being spaced from the outer wall throughout substantially the full extent of each and opening at an outer rim portion communicating with said air passage chamber; and air movement means adapted to introduce air under pressure through the openings in the outer wall and about said rim portion in a surrounding air curtain.

4. A cooking device comprising:

an outer wall having an opening formed therein;

the outer wall having a peripheral side wall;

an inner brazier having a base and a side wall;

a grill mounted on the side wall of the brazier;

spacer means extending between the outer wall and the brazier to space the same from one another and define an air passage chamber therebetween; and air movement means for the introduction of air into the air chamber and expulsion of the air between said side walls in an air curtain.

5. A cooking device comprising:

an outer wall;

an inner wall;

the outer and inner walls being spaced from one another;

grill means associated with the inner wall; and means for the introduction of a stream of air between the walls and outwardly thereof in an air curtain about the grill.

References Cited

UNITED STATES PATENTS

| | | | |
|---|---|---|---|
| 3,147,367 | 9/1964 | Magnusson | 219—366 |
| 3,159,119 | 12/1964 | Hottenroth et al. | 126—25 X |
| 3,266,478 | 8/1966 | Booth | 126—25 |

FREDERICK KETTERER, *Primary Examiner.*